United States Patent Office 3,847,936
Patented Nov. 12, 1974

---

3,847,936
O,O-DIALKYL-O-[1,2-DIAZOLIDIN-ONES-5-YL-3]-THIONOPHOSPHATES
Heinrich Adolphi, Limburgerhof, Wolfram Dietsche, Altrip, Franz Merger, Frankenthal, Peter Beutel, Mannheim, and Rolf Huber, Ludwigshafen, Germany, assignors to Badische Anilin- & Soda-Fabrik Aktiengesellschaft, Ludwigshafen (Rhine), Germany
No Drawing. Filed Dec. 7, 1972, Ser. No. 312,974
Claims priority, application Germany, Dec. 18, 1971, P 21 63 063.7
Int. Cl. C07f 9/16
U.S. Cl. 260—310 A     6 Claims

ABSTRACT OF THE DISCLOSURE

New and valuable O,O-dialkylthionophosphoric esters having a strong insecticidal action, pesticides containing these compounds as active ingredients, and a process for controlling pests with these compounds. The esters are O,O-dialkyl-O-[1,2-diazolidin-ones-5-yl-3]-thionophosphates which may be substituted in the 1-position by lower alkyl, phenyl or chlorophenyl. They may be further substituted in the 4-position by lower alkyl, lower alkoxymethyl, lower alkoxyethyl, lower alkoxymethylene or a hydrocarbon ring having 5 or 6 members including the carbon in the 4-position.

---

The present invention relates to new and valuable O,O-dialkylthionophosphoric esters having a strong insecticidal action, pesticides containing these compounds as active ingredients, and a process for their production and use as pesticides.

It is known to use phosphoric ester derivatives as pesticides. However, they have a poor biological action.

We have now found that O,O-dialkylthionophosphoric esters of the formula

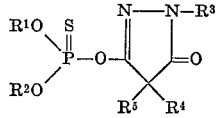

where $R^1$ and $R^2$ are identical or different and each denotes lower alkyl (methyl, ethyl), $R^3$ denotes hydrogen, lower alkyl (methyl, ethyl, n-propyl and isopropyl), aryl (phenyl) or chlorophenyl, and $R^4$ and $R^5$ are identical or different and each denotes hydrogen, lower alkyl (methyl, ethyl, propyl, butyl), lower alkoxyalkyl (methoxymethyl, ethoxymethyl, methoxyethyl) or together denote alkoxymethylene (ethoxymethylene) or a hydrocarbon ring having several members (five- or six-membered, for example, pentamethylene), have a good insecticidal action.

The new active ingredients may be prepared by reacting an O,O-dialkylthionophosphoric ester halide of the formula

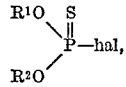

where $R^1$ and $R^2$ have the meanings given above and hal denotes a halogen atom (chlorine, bromine), with a pyrazolidinedione of the formula

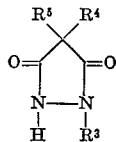

where $R^3$, $R^4$ and $R^5$ have the above meanings, or with an alkali metal salt thereof.

The pyrazolidinediones may be prepared for instance analogously to the processes described in the literature (Helv. chim. acta, 36, 74, 1953) by reaction of unsubstituted or substituted malonic diesters with hydrazine or monoalkyl hydrazines and subsequent cyclization employing suitable condensing agents, e.g., sodium methylate, in accordance with the following equation:

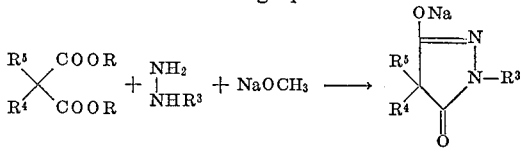

$R^3$, $R^4$ and $R^5$ have the above meanings, and R denotes lower alkyl. The pyrazolidinediones can be separated by adding acid to the sodium salts.

The unsubstituted or substituted malonic dialkyl esters are described in the literature with the exception of the dimethyl ester of cyclohexene-1,1-dicarboxylic acid, b.p.: 70° to 72° C.; $n_D^{25}$: 1.4515.

The active ingredients are advantageously prepared in the presence of acid-binding agents, e.g., alkali metal carbonates, alcoholates, and hydroxides, and organic bases such as pyridine and trialkylamines. However, it is also possible to react preferably the alkali metal salts of the pyrazolidinediones with thionophosphoric ester halides of the above formula. The reaction is advantageously carried out in an inert organic solvent at a temperature of from 0° to 150° C., preferably from 30° to 130° C. Particularly suitable solvents are ketones, benzene, toluene, dioxane, nitriles such as acetonitrile and propionitrile, dimethylformamide, dimethyl sulfoxide and esters of organic acids. The yield may be increased by heating and stirring, after combining the starting materials, for a fairly long period of time at the prescribed temperature.

The thionophosphoric ester halides required as starting materials are known.

As a result of the variability of the malonic diesters and monoalkyl hydrazines used as starting materials it is possible to obtain numerous pyrazolidinediones bearing different substituents, whose phosphoric esters of the above formula have good insecticidal properties. The new thionophosphoric esters are generally colorless to reddish oils which are difficultly soluble in water and are difficult to distil even at considerable subatmospheric pressures without decomposition occurring. The compounds have an excellent action on a plurality of pests, and are therefore admirably suited for use as pesticides in the plant protection field.

The preparation and use of the new compounds are illustrated in the following examples.

The sodium salts of the pyrazolidinediones are obtained in good yields and high purity in the following manner. The hydrazides initially formed in the reaction of unsubstituted or substituted malonic diesters with hydrazine or substituted hydrazines are immediately cyclized with methanolic sodium methylate solution (technical grade); to complete the reaction, the mixture is boiled for some time under reflux. The sodium salts are soon precipitated or may, depending on the substituents, be isolated by removing the solvent in vacuo. It has been found to be advantageous to heat the salts freed from solvent for some time at 130° C.

The salts obtained in this way are sufficiently pure for subsequent phosphorylation.

EXAMPLE 1

(a) 1-methyl-4,4-dimethylpyrazolidinedione-3,5 (sodium salt)

91.8 parts by weight of the dimethyl ester of dimethylmalonic acid is added to 100 parts by weight of 31% by weight methanolic sodium methylate solution (technical grade) diluted with 100 parts by weight of methanol. While stirring this mixture, 26.4 parts by weight of methylhydrazine is then dripped in. The whole is heated for 3 hours under reflux and stirred overnight. The methanol is then removed in a film evaporator and the residue kept for 3 hours at 130° C. The salt is then dried at 60° C. under an oil pump vacuum (0.5 mm. Hg.).

Yield: approx. 90 parts by weight.

All others salts may be prepared in analogous manner.

(b) O,O-diethyl-O-[1-methyl-4,4-dimethyl-1,2-diazolidin-one-5-yl-3]-thionophosphate

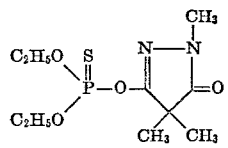

500 parts of acetonitrile is added to 90 parts by weight of the sodium salt of 1-methyl-4,4-dimethylpyrazolidine-dione-3,5 and the mixture heated at 50° C. Over a period of 30 minutes 108.4 parts by weight of O,O-diethyldithiophosphoryl chloride is dripped in. Subsequently, the temperature of the mixture is raised until it boils under reflux; it is then kept for 16 hours at this temperature. The reaction mixture is then cooled to room temperature, the precipitated sodium chloride is removed by suction filtration and the solvent removed in vacuo. The residue is taken up in benzene and washed with 100 parts by weight of water and then with 100 parts by weight of 10% (by weight) aqueous NaHCO₃ solution, the benzene phase is removed and dried over Na₂SO₄, the solvent is removed and the residue freed from volatile impurities by heating for 2 hours at 90° C. and a pressure of 0.5 mm. Hg.

Yield: 120 parts of orange-colored oil, $n_D^{20}$: 1.4829.

*Analysis.*—Calc.: C, 40.75; H, 6.51; N, 9.52; P, 10.51; S, 10.89. Found: C, 40.8; H, 6.7; N, 8.6; P, 10.7; S, 10.2.

The following compounds were prepared analogously:

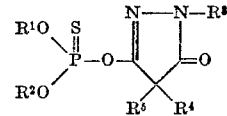

| R¹ | R² | R³ | R⁴ | R⁵ | $n_D^2$ |
|---|---|---|---|---|---|
| CH₃ | CH₃ | CH₃ | CH₃ | CH₃ | 1.4881 |
| CH₃ | CH₃ | H | CH₃ | CH₃ | -------- |
| CH₃ | CH₂ | C₂H₅ | CH₃ | CH₃ | -------- |
| CH₃ | CH₃ | i-C₃H₇ | CH₃ | CH₃ | -------- |
| CH₃ | CH₃ | –⟨phenyl⟩ | CH₃ | CH₃ | -------- |
| CH₃ | CH₃ | CH₃ | H | CH₃ | -------- |
| CH₃ | CH₃ | CH₃ | H | C₂H₅ | -------- |
| CH₃ | CH₃ | CH₃ | H | –CH₂–O–C₂H₅ | -------- |
| CH₃ | CH₃ | CH₃ | H | CH₂–CH₂–O–CH₃ | -------- |
| CH₃ | CH₃ | CH₃ | ⟨cyclohexyl⟩ | | -------- |
| C₂H₅ | C₂H₅ | CH₃ | CH₃ | CH₃ | 1.4754 |
| C₂H₅ | C₂H₅ | H | CH₃ | CH₃ | -------- |
| C₂H₅ | C₂H₅ | C₂H₅ | CH₃ | CH₃ | -------- |
| C₂H₅ | C₂H₅ | i-C₃H₇ | CH₃ | CH₃ | -------- |
| C₂H₅ | C₂H₅ | –⟨phenyl⟩ | CH₃ | CH₃ | -------- |
| C₂H₅ | C₂H₅ | CH₃ | CH₃ | n-C₃H₇ | 1.4771 |
| C₂H₅ | C₂H₅ | CH₃ | C₂H₅ | C₂H₅ | 1.4800 |
| C₂H₅ | C₂H₅ | CH₃ | C₂H₅ | n-C₄H₉ | -------- |
| C₂H₅ | C₂H₅ | CH₃ | n-C₃H₇ | n-C₃H₇ | -------- |
| C₂H₅ | C₂H₅ | CH₃ | n-C₄H₉ | n-C₄H₉ | 1.4741 |
| C₂H₅ | C₂H₅ | CH₃ | H | CH₂–O–CH₃ | 1.4972 |
| C₂H₅ | C₂H₅ | CH₃ | | =CH–OC₂H₅ | 1.4945 |
| C₂H₅ | C₂H₅ | CH₃ | ⟨cyclohexyl⟩ | | 1.4931 |
| C₂H₅ | C₂H₅ | –⟨C₆H₄–Cl⟩ | CH₃ | CH₃ | -------- |
| C₂H₅ | C₂H₅ | –⟨C₆H₃Cl₂⟩ | CH₃ | CH₃ | -------- |

The agents according to the invention may be used as solutions, emulsions, suspensions or dusts. The form of application depends entirely on the purpose for which the agents are being used; in any case it should ensure a fine distribution of the active ingredient.

For the preparation of the solutions to be sprayed direct, hydrocarbons having boiling points higher than 150° C., e.g. tetrahydronaphthalene or alkylated naphthalenes, or organic liquids having boiling points higher than 150° C. and having one or more than one functional group, e.g. the keto group, the ether group, the ester group or the amide group, this group or these groups being attached as substituent(s) to a hydrocarbon chain or being a component of a heterocyclic ring, may be used as spray liquids.

Aqueous formulations may be prepared from emulsion concentrates, pastes or wettable powders by adding water. To prepare emulsions the ingredients as such or dissolved in a solvent may be homogenized in water or organic solvents by means of wetting or dispersing agents, e.g., polyethylene oxide adducts. Concentrates which are suitable for dilution with water may be prepared from active ingredient, emulsifying or dispersing agent and possibly solvent.

Dusts may be prepared by mixing or grinding the active ingredients with a solid carrier, e.g., kieselguhr, talc, clay or fertilizers.

The new active ingredients may be used by allowing an insecticidal amount of the compound to act on the insects or the objects to be protected against them, e.g., plants.

The compounds may be applied in conventional manner, e.g., by spraying, dusting, evaporating, atomizing or brushing.

EXAMPLE 2

90 parts by weight of the compound of Example 1 is mixed with 10 parts by weight of N-methyl-α-pyrrolidone. A mixture is obtained which is suitable for application in the form of very fine drops.

EXAMPLE 3

20 parts by weight of the compound of Example 1 is dissolved in a mixture consisting of 80 parts by weight of xylene, 10 parts by weight of the adduct of 8 to 10 moles of ethylene oxide to 1 mole of oleic acid-N-monoethanolamide, 5 parts by weight of the calcium salt of dodecylbenzenesulfonic acid, and 5 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 4

20 parts by weight of the compound of Example 1 is dissolved in a mixture consisting of 40 parts by weight of cyclohexanone, 30 parts by weight of isobutanol, 20 parts by weight of the adduct of 7 moles of ethylene oxide to 1 mole of isooctylphenol, and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 5

20 parts by weight of the compound of Example 1 is dissolved in a mixture consisting of 25 parts by weight of cyclohexanol, 65 parts by weight of a mineral oil fraction having a boiling point between 210° and 280° C., and 10 parts by weight of the adduct of 40 moles of ethylene oxide to 1 mole of castor oil. By pouring the solution into 100,000 parts by weight of water and uniformly distributing it therein, an aqueous dispersion is obtained containing 0.02% by weight of the active ingredient.

EXAMPLE 6

20 parts by weight of the compound of Example 1 is well mixed with 3 parts by weight of the sodium salt of diisobutylnaphthalene-α-sulfonic acid, 17 parts by weight of the sodium salt of a lignin sulfonic acid obtained from a sulfite waste liquor, and 60 parts by weight of powdered silica gel, and triturated in a hammer mill. By uniformly distributing the mixture in 20,000 parts by weight of water, a spray liquid is obtained containing 0.1% by weight of the active ingredient.

EXAMPLE 7

3 parts by weight of the compound of Example 1 is intimately mixed with 97 parts by weight of particulate kaolin. A dust is obtained containing 3% by weight of the active ingredient.

EXAMPLE 8

30 parts by weight of the compound of Example 1 is intimately mixed with a mixture consisting of 92 parts by weight of powdered silica gel and 8 parts by weight of paraffin oil which has been sprayed onto the surface of this silica gel. A formulation of the active ingredient is obtained having good adherence.

To examine the insecticidal action of the new active ingredients, we selected the following compounds of the invention:

I 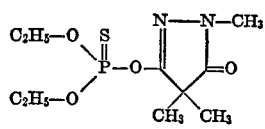

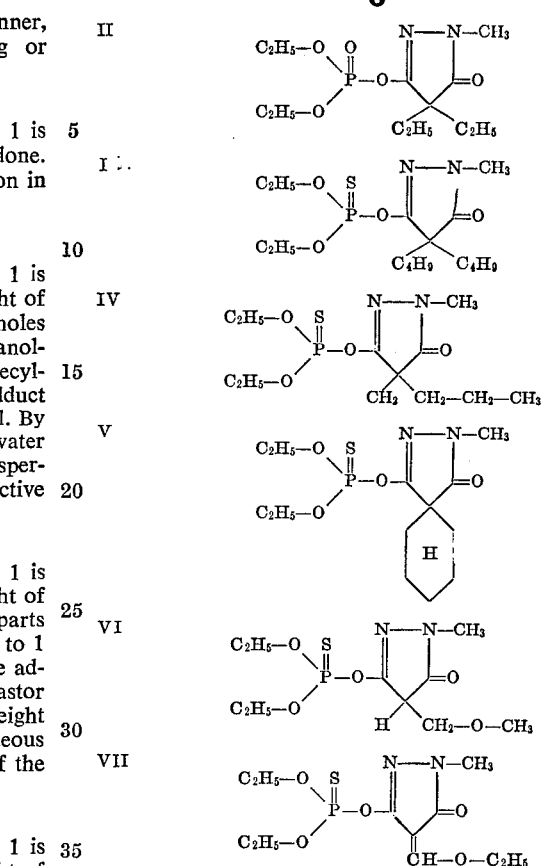

The following conventional compounds were used for comparison purposes:

(Phosalone)
French Patent 1,482,025

(Diazinon)
German Patent 910,652

EXAMPLE 9

Administration test on houseflies (*Musca domestica*)

1 mm.³ of an acetonic solution of the active ingredients is applied to the ventral abdomen of 4-day old houseflies under slight CO₂ narcosis. The mortality after 4 hours is used to calculate the $LD_{50}$.

| Active ingredient: | $LD_{50}$ (γ/fly) |
|---|---|
| I | 0.17 |
| II | 0.11 |
| III | 0.92 |
| IV | 0.31 |
| V | 0.52 |
| VI | 0.63 |
| VII | 0.37 |
| A | 1.0 |

EXAMPLE 10

Continuous contact experiment with oriental cockroaches (*Blatta orientalis*)

Adult cockroaches are placed in 1-liter beakers whose base and walls have been wetted with acetonic solutions of the active ingredients. After the solvent has evaporated, the active ingredient remains as a thin layer. The action is determined after 48 hours.

| Active ingredient | Amount of active ingredient (mg./beaker) | Mortality (percent) |
|---|---|---|
| I | 0.01 | >80 |
| II | 0.025 | 80 |
| IV | 0.05 | 80 |
| V | 0.25 | 100 |
| VI | 0.25 | 90 |
| VII | 0.25 | 100 |
| A | 2.50 | 100 |
|   | 1.00 | 30 |

EXAMPLE 11

Contact action on granary weevils (*Sitophilus granarius*)

Pieces of glass (8 x 8 cm.) with a roughened surface are treated with acetonic solutions of the active ingredients. After the solvent has evaporated, 50 weevils are placed on this surface under a watch glass for 4 hours. The weevils are then transferred to clean observation vessels. The mortality is determined after 24 hours and the $LD_{50}$ calculated therefrom.

Active ingredient:            $LD_{50}$ (mg.)
- I    0.01
- II    0.022
- IV    0.04
- A (inffective)    1.0
- B    0.05

EXAMPLE 12

Action on caterpillars of the cabbage moth (*Plutella macuipennis*)

Young cabbage leaves are dipped into aqueous emulsions of the active ingredients. After a short drying period caterpillars of the cabbage moth (4th larval stage) are placed on the leaves. The mortality is determined after 48 hours.

| Active ingredient | Concentration of the active ingredient in emulsion (wt. percent) | Mortality (percent) |
|---|---|---|
| I | 0.0025 | >80 |
| II | 0.01 | >80 |
| III | 0.02 | >80 |
| IV | 0.005 | >80 |
| V | 0.005 | >80 |
| VI | 0.01 | >80 |
| VII | 0.025 | >80 |
| A | 0.05 | >80 |
|   | 0.025 | 20 |

EXAMPLE 13

Action on larvae of the yellow fever mosquito (*Aedes aegypti*)

200 ml. of boiled tap water is placed in vessels and aqueous emulsions of the active ingredients are added. Larvae in the 5th stage are then introduced into the vessels. The mortality is determined after 24 hours.

| Active ingredient | Concentration of the active ingredient in water (parts by weight) | Mortality (percent) |
|---|---|---|
| I | 0.1 p.p.m. | >90 |
| II | 0.1 p.p.m. | >90 |
| A | 0.35 p.p.m. | 90 |
|   | 0.2 p.p.m. | 30 |
| B | 0.2 p.p.m. | 95 |
|   | 0.1 p.p.m. | 25 |

We claimed:

1. A dialkylthionophosphoric ester of the formula $$\begin{array}{c} R^1O \\ \diagdown \\ R^2O \end{array} \!\!\!\! \begin{array}{c} S \\ \| \\ P\!-\!O \end{array} \!\!\!\!\! \begin{array}{c} N\!-\!\!-\!N\!-\!R^3 \\ \diagdown \\ R^5 \quad R^4 \end{array} \!\!=\!O$$

where $R^1$ and $R^2$ are identical or different and each denotes lower alkyl, $R^3$ denotes hydrogen, lower alkyl, phenyl or chlorophenyl, $R^4$ and $R^5$ are identical or different and each denotes lower alkyl, lower alkoxymethyl, lower alkoxyethyl, or together denote lower alkoxymethylene or pentamethylene.

2. A dialkylthionophosphoric ester as claimed in claim 1 wherein $R^1$ and $R^2$ denote methyl or ethyl; and $R^3$, $R^4$ and $R^5$ each denote methyl.

3. A dialkylthionophosphoric ester as claimed in claim 1 wherein $R^1$ and $R^2$ denote methyl or ethyl; $R^3$ denotes methyl, ethyl, propyl or isopropyl; and $R^4$ and $R^5$ denote methyl or ethyl.

4. A dialkylthionophosphoric ester as claimed in claim 1 wherein $R^1$ and $R^2$ are methyl or ethyl; $R^3$ is phenyl or chlorophenyl; and $R^4$ and $R^5$ are methyl.

5. A dialkylthionophosphoric ester as claimed in claim 1 wherein $R^1$ and $R^2$ are methyl or ethyl; $R^3$ is methyl; and $R^4$ and $R^5$ together denote a pentamethylene.

6. The compound $$\begin{array}{c} C_2H_5\!-\!O \\ \diagdown \\ C_2H_5\!-\!O \end{array} \!\!\!\! \begin{array}{c} S \\ \| \\ P\!-\!O \end{array} \!\!\!\!\! \begin{array}{c} N\!-\!\!-\!N\!-\!CH_3 \\ \diagdown \\ CH_3 \quad CH_3 \end{array} \!\!=\!O$$

References Cited

FOREIGN PATENTS 713,278    8/1954    Great Britain ----- 260—310 A

OTHER REFERENCES

Maguire et al., J. Chem. Soc. (London), 1958, pages 2299–2301.

NATALIE TROUSOF, Primary Examiner

U.S. Cl. X.R.

260—310 B; 424—200